United States Patent
DeBates et al.

(10) Patent No.: US 10,282,573 B1
(45) Date of Patent: May 7, 2019

(54) DETERMINING BLOCKED WIRELESS COMMUNICATION BETWEEN DEVICES

(71) Applicant: Motorola Mobility LLC, Chicago, IL (US)

(72) Inventors: Scott Patrick DeBates, Crystal Lake, IL (US); Douglas Alfred Lautner, Round Lake, IL (US); Jagatkumar V. Shah, Lake In The Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/816,171

(22) Filed: Nov. 17, 2017

(51) Int. Cl.
   *G06K 19/07*     (2006.01)
   *G06K 7/10*      (2006.01)
   *H04B 5/00*      (2006.01)
   *G06T 7/70*      (2017.01)
   *H04N 7/18*      (2006.01)

(52) U.S. Cl.
   CPC ........... *G06K 7/10297* (2013.01); *G06T 7/70* (2017.01); *H04B 5/0062* (2013.01); *H04N 7/185* (2013.01); *G06K 7/10425* (2013.01); *G06K 19/0723* (2013.01)

(58) Field of Classification Search
   USPC .......................................... 235/439, 435, 375
   See application file for complete search history.

(56) References Cited

U.S. PATENT DOCUMENTS

| | | | | |
|---|---|---|---|---|
| 2013/0080522 | A1* | 3/2013 | Ren | H04L 12/6418 709/204 |
| 2014/0267547 | A1* | 9/2014 | Torgersrud | H04W 12/08 348/14.02 |
| 2017/0358201 | A1* | 12/2017 | Govers | G05D 1/0248 |

OTHER PUBLICATIONS

"Non-Final Office Action", U.S. Appl. No. 16/274,089, filed Mar. 22, 2019, 9 pages.

* cited by examiner

*Primary Examiner* — Edwyn Labaze
(74) *Attorney, Agent, or Firm* — Wolfe-SBMC (57) ABSTRACT

In aspects of determining blocked wireless communication between devices, a mobile device wirelessly communicates with a wireless device. The mobile device can receive partial data or no data from the wireless device responsive to the wireless communication. The mobile device activates sensors to obtain sensor data based on receiving the partial or no data from the wireless device. The mobile device can then determine whether an object is positioned or located between the mobile device and the wireless device based on the sensor data, and determine that the object is likely blocking the wireless communication based on the object being positioned or located between the devices. The mobile device can then display a notification that the wireless communication is being blocked based on the determination that the object is likely blocking the wireless communication.

20 Claims, 4 Drawing Sheets

DETERMINING BLOCKED WIRELESS COMMUNICATION BETWEEN DEVICES

BACKGROUND

An object positioned between devices can cause communication path loss of radio frequency (RF) signals such that wireless communication between the devices is blocked or disrupted, causing data transmitted from one of the devices not being received completely or at all. Conventional systems used for wireless communication between devices can typically implement a retry mechanism when an expected response from a device is not received. Subsequent retries of the wireless communication will continue to fail until the object is no longer blocking or disrupting the wireless communication that causes the path loss of RF signals. This type of retry mechanism can cause an increase in power consumption by either one or both of the devices implementing the retry mechanism to establish a successful communication.

BRIEF DESCRIPTION OF THE DRAWINGS

Aspects of determining blocked wireless communication between devices are described with reference to the following Figures. The same numbers may be used throughout to reference similar features and components that are shown in the Figures.

DETAILED DESCRIPTION

Determining blocked wireless communication between devices is described, and can be implemented by a mobile device to determine that an object may be blocking wireless communication between the mobile device and another wireless communication device. For example, a mobile device, such as a mobile phone, typically includes a transceiver for wireless communication with the wireless device. When an object is positioned or located between the mobile device and the wireless device, the wireless communication between the devices may be blocked by the object, which can cause partial data or no data to be received by either the mobile device or the wireless device. An object blocking the wireless communications between the devices may be any type of item or entity that causes interference with the wireless communication or path loss of RF signals between the devices, such as boxes, furniture, machinery, equipment, people, and the like. An object blocking wireless communications between devices is also referred to herein as a signal blocking object.

Although aspects of determining blocked wireless communication between devices are shown and described herein with reference to the two devices, a mobile device and a wireless device, the described aspects and techniques are applicable to any number and/or types of devices implemented for wireless communication that may encounter a signal blocking object. Further, although identified specifically as a mobile device and a wireless device for ease of description and explanation, either or both of the devices may be mobile and/or wireless devices implemented for wireless communication, such as mobile phones, tablet devices, and the like. Alternatively, in an aspect of determining blocked wireless communication between devices, the mobile device may be a mobile phone that is implemented to communicate with the wireless device as a radio frequency identification (RFID) tag that responds to interrogation communications from an RFID reader of the mobile device.

A transceiver of a mobile device can receive a response signal from the wireless device in response to a signal transmitted by the transceiver of the mobile device, and the response signal can include identifying data of the wireless device. The identifying data can include information associated with the wireless device. Additionally, the identifying data may include additional information about a different object that the wireless device is attached to, such as an RFID tag attached to the different object, which is proximal to the wireless device. In implementations, the transceiver of the mobile device may be a RFID reader that is integrated with the mobile device, and the RFID reader communicates an interrogation signal to the wireless device (e.g., a RFID tag), which receives and responds to the interrogation signal.

As described above, a signal transmitted by the transceiver of the mobile device may not be received by the wireless device when a signal blocking object is causing interference with the signal. Alternatively, the signal transmitted by the transceiver of the mobile device is received by the wireless device, however, a response signal from the wireless device is not received by the mobile device when the signal blocking object is causing interference with the response signal. In aspects of determining blocked wireless communication between devices, when a response signal is not received by the mobile device, then the mobile device can determine that the signal blocking object is likely blocking or causing interference with the wireless communication between the devices based on data that indicates the signal blocking object is positioned or located between the devices. The data, also referred to herein as object detection data, can be detected and/or received from various components of the mobile device.

For example, the mobile device can include a thermal infra-red (IR) sensor to detect a heat signature from the signal blocking object and generate sensor data associated with the heat signature, such as to detect a person that may be blocking the wireless communication between the devices. The mobile device can also include one or more cameras to capture images of the surrounding environment of the mobile device. The sensor data and/or captured images can be processed and analyzed to determine whether the signal blocking object is positioned or located between the devices. If the signal blocking object is positioned or located between the devices, then it can be determined that the signal blocking object is likely blocking or causing interference with the wireless communication.

Additionally, the mobile device can include motion sensors, such as in an inertial measurement unit (IMU) or micro-electro-mechanical system (MEMS), to sense motion of the mobile device as a user moves and changes orientations of the device and/or as the device moves with the user to various different locations. If it has been determined that a signal blocking object is likely blocking the wireless communication between the devices, and then the mobile device moves to another location, the mobile device can be implemented to retry or initiate another wireless communication with the wireless device. The change in location of the mobile device can be detected by the motion sensors, and the change in location can result in the signal blocking object no longer blocking the wireless communication between the devices.

In aspects of determining blocked wireless communication between devices, the mobile device can implement a scanning application that is implemented to determine whether an object is likely blocking wireless communication between the mobile device and the wireless device, and each of the devices includes a transceiver to facilitate the wireless communication between the devices. Generally, the mobile device implements the scanning application, which initiates the transceiver of the mobile device for wireless communication with the wireless device.

If partial data or no data is received from the wireless device in response to a wireless communication from the mobile device, then the scanning application can activate any one of a sensor, a camera, and/or other components of the mobile device to determine whether an object is positioned or located between the devices based on the data received from the sensor, the camera, and/or the other components. The scanning application can then determine whether the object is likely blocking the wireless communication between the devices based on the determination that the object is positioned or located between the devices. The scanning application can also be implemented to initiate display of a notification that indicates to a user of the mobile device that the object is blocking wireless communication with the wireless device.

Alternatively or in addition, the scanning application can be implemented as a background application that periodically initiates wireless communication with available wireless devices within range of the mobile device. The period between wireless communications initiated by the scanning application is referred to herein as a scanning cycle. The scanning application can be implemented to adjust the scanning cycle to delay a subsequent wireless communication responsive to determining that the object is likely blocking the wireless communication when the object is positioned between the devices. The scanning application of the mobile device can also repeat or retry communication with the wireless device in response to determining that the object is likely blocking communication between the devices. As described herein, the aspects of determining blocked wireless communication between devices can be implemented to determine that an object is likely blocking wireless communication between devices, and notify the user of the communication problem, along with an indication to change position and/or retry the communication.

While features and concepts of determining blocked wireless communication between devices can be implemented in any number of different devices, systems, environments, and/or configurations, implementations of determining blocked wireless communication between devices are described in the context of the following example devices, systems, and methods.

Figure 1:
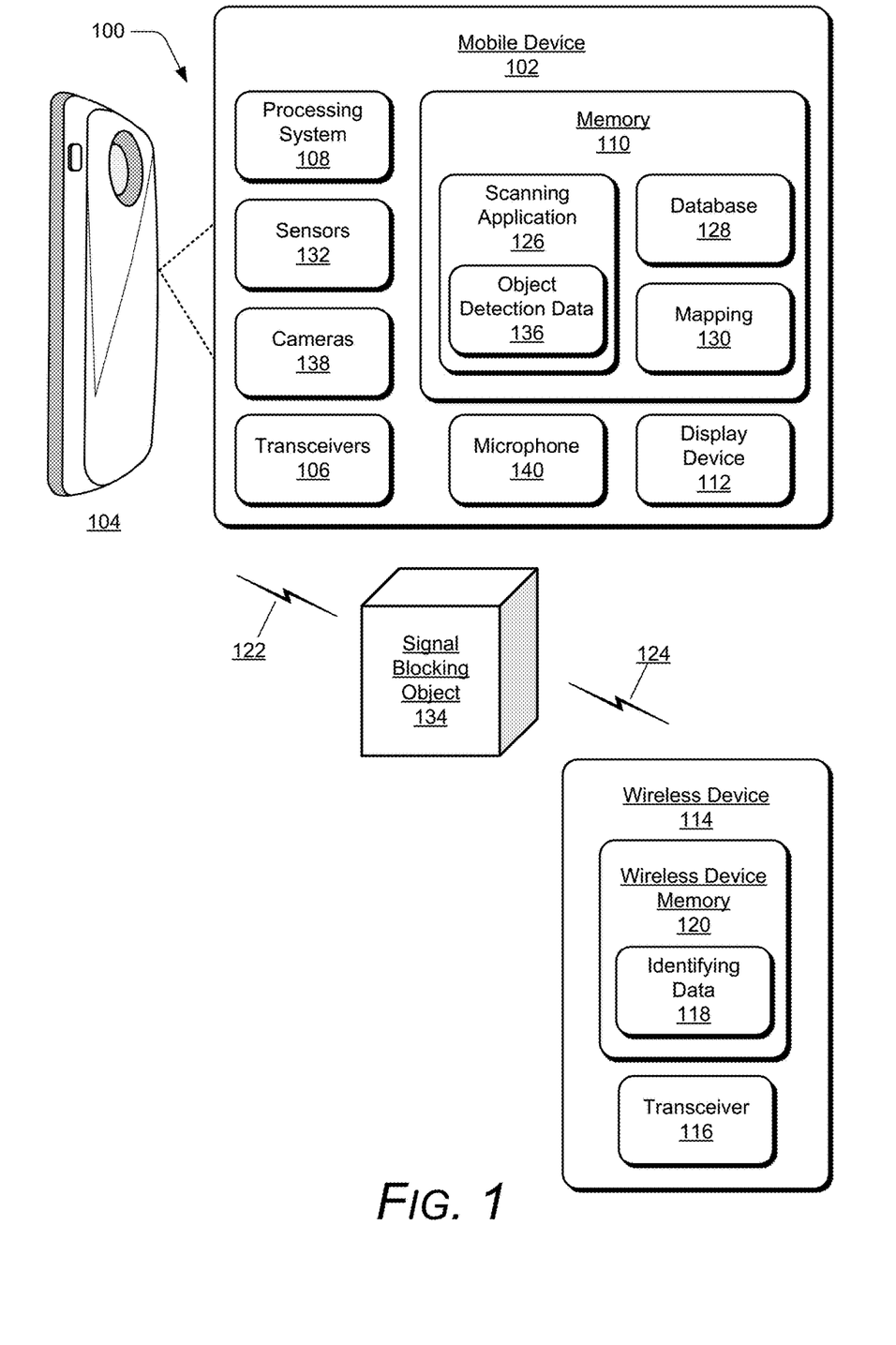
FIG. 1 illustrates an example system in which aspects of determining blocked wireless communication between devices can be implemented.

FIG. 1 illustrates an example system 100 in which aspects of determining blocked wireless communication between devices can be implemented. The example system 100 includes any type of a mobile device 102, such as a mobile phone 104 or tablet device that includes transceivers 106, either as an integrated component of the mobile device 102 or as an attachment that operates with the mobile device.

Generally, the mobile device 102 is any type of an electronic and/or computing device implemented with various components, such as a processing system 108 and memory 110, as well as any number and combination of different components as further described with reference to the example device shown in FIG. 4. For example, the mobile device 102 can include an integrated display device 112. In implementations, a transceiver 106 of the mobile device 102 may be a RFID reader that is integrated with the mobile device as shown and described with reference to FIG. 2. The RFID reader can communicate an interrogation signal to wireless devices (e.g., RFID tags), which receive and respond to the interrogation signal.

The example system 100 can include any number of wireless devices, such as wireless device 114, which includes a transceiver 116 that communicates with one of the transceivers 106 of the mobile device 102. As noted above, the wireless device 114 may be any other type of mobile device, such as another mobile phone, a tablet device, and/or any type of computing device for wireless communication with the mobile device 102. Alternatively, the wireless device 114 may be implemented as a radio frequency identification (RFID) tag, or other type of wireless tag, such as a Wi-Fi tag, a Bluetooth™ tag, a Near Field Communication (NFC) tag, and the like. As an RFID tag, the wireless device 114 can be associated with any type of object or item, such as by being placed in or affixed to an object for inventory tracking, item location, item recovery, and the like. This is further shown and described with reference to FIG. 2.

In this example system 100, the wireless device 114 is implemented for two-way wireless communication with the transceiver 106 of the mobile device 102 that communicates with the transceiver 116 of the wireless device 114, requesting the identifying data 118 stored in the wireless device memory 120. The transceiver 106 of the mobile device 102 can transmit a signal 122 (a wireless communication signal) via an antenna of the transceiver 106 or antenna system of the mobile device 102 as broadcast messages requesting that wireless devices in communication range return the identifying data stored in memory of the wireless devices. The antenna of the transceiver 106 or the antenna system of the mobile device 102 may be a directional antenna or an omnidirectional antenna, usable by the transceiver 106 to transmit the signal 122 to the wireless devices.

The transceiver 116 of the wireless device 114 can receive the signal 122 from the transceiver 106 of the mobile device 102, and then wirelessly communicate a response signal 124 back to the transceiver 106 of the mobile device 102 via a radio frequency (RF) communication channel. The response signal 124 from the wireless device 114 can include the identifying data 118, a received signal strength indication (RSSI) that indicates the strength of the response signal 124 from the wireless device 114, and/or any other data stored in the wireless device memory 120. The signal 122 transmitted from the mobile device, as well as the response signal 124 from the wireless device, can be communicated using low frequency (LF), high frequency (HF), or ultra-high frequency (UHF) radio waves.

The transceivers 106 of the mobile device 102 and the transceiver 116 of the wireless device 114 can include various, different wireless radio systems, such as for Wi-Fi, Bluetooth™, Mobile Broadband, LTE, Near Field Communication (NFC), or any other wireless radio system or format for communication via respective wireless networks. Generally, the mobile device 102 implements the transceivers 106 that each include a radio device, antenna, and chipset implemented for cellular, wireless, and/or other network communication with other devices, networks, and services. Each of the transceivers 106 and the transceiver 116 can be configured to implement any suitable communication protocol or standard to enable wireless communication between the mobile device 102 and the wireless device 114.

In this example, the mobile device 102 includes a scanning application 126 that implements features of determining blocked wireless communication between devices, as described herein. The scanning application 126 can be implemented as a software application or software module, such as computer-executable software instructions that are executable with a processor (e.g., with the processing system 108). As a software application, the scanning application 126 can be stored on computer-readable storage memory (e.g., the memory 110), or any suitable memory device or electronic data storage implemented with the mobile device. Alternatively, the scanning application may be implemented in hardware, or as a combination of software and hardware components.

The scanning application 126 initiates wireless communication with the wireless device 114 via the transceiver 106. Typically, when the mobile device 102 is within communication range of the wireless device 114, the scanning application 126 can initiate wireless communication via the transceiver 106 that transmits the signal 122, and the transceiver 106 receives the response signal 124 from the wireless device 114 that is transmitted via the transceiver 116. The received response can be stored in the transceiver 106 and/or in the memory 110 of the mobile device 102.

The scanning application 126 is implemented to store information associated with the wireless devices in the memory 110 of the mobile device 102. For example, the received response can be stored in a database 128 in the memory 110 of the mobile device 102. Additionally, the scanning application 126 can be implemented to store information associated with the position of the wireless device 114 and/or mobile device 102 in a mapping 130 in the memory 110 of the mobile device 102. Alternatively or in addition, the database 128 and/or the mapping 130 can be stored in a network storage device or cloud storage device accessible by the mobile device.

In aspects of determining blocked wireless communication between devices, the scanning application 126 can be implemented to detect a particular gesture or an orientation of the mobile device 102 facing in a particular direction. In response to the detection of the particular gesture or the mobile device 102 being orientated or facing in the particular direction, the scanning application 126 is implemented to initiate the wireless communication with the wireless device 114 responsive to the particular gesture or the orientation of the mobile device 102 being detected. Alternatively, another application (e.g., executable software instructions) can be implemented to detect the particular gesture or the orientation of the mobile device 102, and indicate to the scanning application 126 that the particular gesture or the orientation of the mobile device 102 has been detected. The particular gesture or the orientation of the mobile device 102 can be detected based on sensor data received from sensors 132 implemented in the mobile device, such as motion sensors, an inertial measurement unit (IMU), and the like.

The sensors 132 can be implemented to sense motion of the mobile device 102 as a user moves and changes orientations of the device and/or as the device moves with the user to various different locations. The sensors 132 can be implemented with various sensors, such as a gyroscope, an accelerometer, and/or other types of motion sensors to sense motion of the mobile device. The various sensors 132 may also be implemented as components of an IMU or MEMS in the mobile device. The sensors 132 generate sensor data vectors having three-dimensional parameters (e.g., rotational vectors in x, y, and z coordinates) indicating position, location, and/or orientation of the mobile device 102. For example, a user of the mobile device 102 may hold the device in any orientation, such as vertical (perpendicular) as shown in the figure, horizontal (parallel), or at any other angle and rotational orientation.

In implementations, the scanning application 126 can be running on the mobile device 102 as a foreground application that displays a user interface, which is utilized by a user of the mobile device 102 to interface with the application. For example, the user of the mobile device 102 can provide an input in the user interface on the display device 112 to the scanning application 126 to initiate wireless communication with the wireless device 114 as described above. Alternatively or in addition, the input can be provided to the scanning application 126 via any suitable input method, such as via a keyboard, a touchpad, using voice recognition, gestures, and the like.

In other implementations, the scanning application 126 can be running on the mobile device 102 as a background application that periodically initiates the wireless communication with the wireless device 114 based on a scanning cycle. The scanning cycle is associated with a period of time after which the scanning application 126 initiates wireless communication with available wireless devices within range of the mobile device when the period of time has been met or exceeded. For example, the scanning cycle can be set to a period of approximately ten (10) seconds, and the scanning application 126 initiates the wireless communication with the wireless device 114 every ten (10) seconds, or at approximately every ten (10) seconds.

In this example, the system 100 includes a signal blocking object 134 that is positioned between the mobile device 102 and the wireless device 114, and the signal blocking object causes interference with the wireless communication between the devices. The signal blocking object 134 can block or disrupt the signal 122 originating from the transceiver 106 of the mobile device 102 such that the signal 122 is not received by the transceiver 116 of the wireless device 114. Similarly, the transceiver 106 of the mobile device 102 may not receive the response signal 124 from the wireless device 114. Alternatively, the wireless device 114 is able to receive the signal 122 from the mobile device 102, however, the signal blocking object 134 can block or disrupt the response signal 124 originating from the wireless device 114 such that partial data or no data of the response is received by the transceiver 106 of the mobile device 102.

In order to determine whether an object is likely blocking the wireless communication between the devices, the mobile device 102 can include various sensors, cameras, transceivers, a microphone, and the like to determine that the object is positioned or located between the devices. For example, the mobile device 102 can include the sensors 132 to detect a heat signature from the object. The sensors 132 can be implemented with a thermal infra-red (IR) sensor and/or other types of heat sensors to detect the heat signature from the signal blocking object 134. The thermal IR sensor also generates sensor data associated with the heat signature from the signal blocking object 134. The sensor data can be communicated to the scanning application 126 as object detection data 136 that is utilized by the scanning application 126.

The scanning application 126 is implemented to activate the sensors 132 based on a response of partial data or no data from the wireless device. The object detection data 136 is received from the sensors 132 after being activated, and the scanning application 126 can determine whether an object (e.g., the signal blocking object 134) is positioned or located between the mobile device 102 and the wireless device 114 based on the object detection data 136. For example, as noted above, the sensors 132 can be implemented with the thermal IR sensor that generates the sensor data, which the scanning application receives as the object detection data 136. The scanning application 126 can then determine whether the signal blocking object 134 is positioned or located between the mobile device 102 and the wireless device 114 based on the object detection data 136 that indicates a heat signature of the signal blocking object 134 detected by the thermal IR sensor. The scanning application 126 can then determine that the signal blocking object 134 is likely blocking wireless communication between the mobile device 102 and the wireless device 114 based on the signal blocking object 134 being positioned or located between the mobile device 102 and the wireless device 114.

The mobile device 102 can include the one or more cameras 138 to capture images of the surrounding environment that may include the signal blocking object 134. The cameras 138 can be implemented with various cameras, such as an optical camera, a thermal camera, and/or other types of cameras to capture optical and/or thermal images of the surrounding environment near the mobile device 102 as image data. The image data can then be communicated to the scanning application 126 as the object detection data 136 that is utilized by the scanning application.

The scanning application 126 can be implemented to activate the cameras 138 (e.g., an optical camera and/or thermal camera) based on a response of partial data or no data from the wireless device. The object detection data 136 is received from the cameras 138, and the scanning application 126 is implemented to determine whether the signal blocking object 134 is positioned or located between the mobile device 102 and the wireless device 114 based on the object detection data 136. For example, the cameras 138 can be implemented with an optical camera and/or a thermal camera that captures optical and/or thermal images as image data, which the scanning application 126 receives as the object detection data 136. The scanning application 126 can then determine whether the object is positioned or located between the mobile device 102 and the wireless device 114 based on the image data received from the cameras 138 that captures the signal blocking object 134. The scanning application 126 can then determine that the object is likely blocking wireless communication between the mobile device 102 and the wireless device 114 based on the signal blocking object 134 being positioned or located between the mobile device 102 and the wireless device 114.

The mobile device 102 can also include a microphone 140 to capture or detect audio of the surrounding environment. The microphone 140 can be implemented with various microphones, such as a condenser microphone, an ultrasonic microphone, and/or other types of microphones to capture audio near the mobile device 102 as audio data. The audio data can be communicated to the scanning application as the object detection data 136 that is utilized by the scanning application 126.

The scanning application 126 can be implemented to activate the microphone 140 based on a response of partial data or no data from the wireless device 114. The microphone 140 can capture the audio data to determine that a person is near the mobile device 102 by capturing a voice of the person who is blocking the wireless communication between the devices. For example, the scanning application 126 can activate the microphone 140 that detects a conversation or voices near the mobile device 102. The scanning application 126 can then infer that a person is likely blocking or disrupting the wireless communication between the mobile device 102 and the wireless device 114 based on the conversation or voices captured by the microphone 140.

As noted above, the transceivers 106 of the mobile device 102 can include a Bluetooth™ radio. The scanning application 126 can also be implemented to activate the Bluetooth™ radio and scan for Bluetooth™ devices near the mobile device 102 based on a response of partial data or no data from the wireless device. The Bluetooth™ radio can be utilized to determine that a particular Bluetooth™ device is located near the mobile device 102. The scanning application 126 can then infer that a user of the Bluetooth™ device is likely blocking wireless communication between the mobile device 102 and the wireless device 114 based on the particular Bluetooth™ device being located near the mobile device 102. In these examples, the person located near the mobile device is the signal blocking object 134 who is blocking the wireless communication between the devices.

For example, a Bluetooth™ radio of the transceivers 106 in the mobile device 102 can be activated to scan for other Bluetooth™ devices nearby. The particular Bluetooth™ device is detected during the scan, and the particular Bluetooth™ device (e.g., a mobile device, headphones, headset, watch, and the like) typically corresponds to a user using the particular Bluetooth™ device, which can be used by the scanning application 126 as a basis to infer that the user of the particular Bluetooth™ device detected during the scan is likely blocking wireless communication between the mobile device 102 and the wireless device 114.

Additionally, a media access control (MAC) address of the particular Bluetooth™ device can indicate that the particular Bluetooth™ device is a wearable Bluetooth™ device that would typically be attached to the user and follows the user as the user moves locations. A service discovery protocol (SDP) of the Bluetooth™ protocol can indicate that the detected particular Bluetooth™ device supports a particular profile (e.g., a headset profile). The MAC address or the particular profile can be used by the scanning application 126 as a basis to infer that the user of the particular Bluetooth™ device detected during the scan is likely blocking the wireless communication between the mobile device 102 and the wireless device 114. In implementations, Bluetooth™ devices detected during the scan can be utilized by the scanning application 126 to trigger activation of any one or combination of the sensors 132, the cameras 138, and/or the microphone 140 responsive to receiving a response of partial data or no data from the wireless device.

In implementations, the scanning application 126 activates all or any combination of the sensors 132, the cameras 138, a Bluetooth™ radio of the transceivers 106, and the microphone 140 in response to receiving a response of partial data or no data from the wireless device 114. In other implementations, the scanning application 126 selectively activates the sensors 132, the cameras 138, the Bluetooth™ radio, and the microphone 140 prioritized in order of lowest power usage consumed by each respective component. For example, the sensors 132 consumes the least amount of power when activated followed by the microphone 140, then the Bluetooth™ radio, and then the cameras 138.

The scanning application 126 can sequentially activate the sensors 132, the microphone 140, the Bluetooth™ radio, and then the cameras 138 until the scanning application 126 can determine that the signal blocking object 134 is positioned or located between the mobile device 102 and the wireless device 114. For example, the scanning application 126 activates the sensors 132 and determines that the signal blocking object 134 is positioned between the mobile device 102 and the wireless device 114 without activating the microphone 140, the Bluetooth™ radio, or the cameras 138. In another example, the scanning application 126 activates the sensors 132 and the object detection data 136 does not indicate that the signal blocking object 134 is positioned or located between the mobile device 102 and the wireless device 114 based on the sensor data from the sensors 132. The scanning application 126 can then activate the microphone 140 based on the prioritized order of lowest power usage consumed by each component. If the object detection data 136 does not indicate that the signal blocking object 134 is positioned or located between the mobile device 102 and the wireless device 114 based on the audio data from the microphone 140, then the scanning application 126 proceeds to activate the Bluetooth™ radio. In similar fashion, the scanning application 126 proceeds to activate the cameras 138 in a similar manner as discussed above.

Alternatively, the scanning application 126 can sequentially activate any of the components of the mobile device 102 in any suitable order until the scanning application 126 can determine that the signal blocking object 134 is positioned or located between the mobile device 102 and the wireless device 114. For example, the scanning application 126 can be implemented to activate the components of the mobile device 102 in the following order: the sensors 132 first, followed by the cameras 138, then the Bluetooth™ radio, and then the microphone 140.

In implementations, a stowed context of the mobile device 102 can be utilized in determining which of the sensors 132, the cameras 138, the Bluetooth™ radio, and/or the microphone 140 are activated in response to receiving a partial data or no data response from the wireless device 114. For example, the mobile device 102 may be placed in a bag or pocket, which can be detected by the sensors 132 and/or the cameras 138, and a stowed indication of the mobile device 102 is maintained in memory 110 indicating that the mobile device is stowed. The scanning application 126 can receive or obtain the stowed indication of the mobile device and determine which of the sensors and/or components to activate based on the stowed indication for determining whether the signal blocking object is likely interfering with the wireless communication. For example, if the stowed indication indicates that the mobile device 102 is not stowed, then the scanning application 126 can activate any one, combination, or all of the components as discussed above. However, if the stowed indication indicates that the mobile device 102 is stowed, such as in a bag or pocket, then the scanning application 126 may only activate the Bluetooth™ radio of the transceivers 106 and/or the microphone 140 because the sensors 132 and the cameras 138 would not provide any useful data when the mobile device 102 is stowed in the bag or pocket.

In implementations, the scanning application 126 can determine that an object is likely blocking the wireless communication between the devices, and the scanning application 126 can initiate displaying a notification on the display device 112 indicating that the object is blocking the wireless communication. The notification can also include a suggestion that indicates a direction and/or position to move the mobile device 102 for successful wireless communication. The suggestion can be determined based on the mapping 130 and/or object detection data 136 that includes the sensor data, the image data, and/or the audio data. In addition, a received signal strength indication (RSSI) can be utilized by the scanning application 126 to determine a position of the mobile device 102 relative to the wireless device 114. The position of the mobile device 102 based on the RSSI can be utilized by the scanning application 126 in the determination of the suggestion for successful wireless communication with the wireless device 114.

As noted above, the scanning application 126 can be implemented as a background application that periodically initiates the wireless communication with the wireless device 114 based on a scanning cycle. In response to a determination that the object is likely blocking the wireless communication, the scanning cycle can be adjusted by the scanning application 126 to delay subsequent wireless communication with the wireless device 114. For example, the scanning cycle may be set to a period of ten (10) seconds, and in response to the determination that the signal blocking object 134 is blocking the wireless communication, the scanning application 126 can increase the scanning cycle to sixty (60) seconds to delay a subsequent initiation of the wireless communication. When the scanning application 126 has determined that the signal blocking object 134 is no longer positioned between the devices, the scanning application 126 can then decrease the scanning cycle back to the original period of ten (10) seconds.

The scanning application 126 can also be implemented to repeat or retry initiation of the wireless communication with the wireless device responsive to the determination that the object is likely blocking the wireless communication. For example, the scanning application can wait until the signal blocking object 134 is no longer positioned or located between the mobile device 102 and the wireless device 114 based on the object detection data 136, and then retry initiation of the wireless communication with the wireless device 114.

As noted above, the sensors 132 can be activated based on a response of partial data or no data received from the wireless device 114. The scanning application 126 can be implemented to keep the sensors 132 activated subsequent to the determination that the signal blocking object 134 is likely blocking the wireless communication between the mobile device 102 and the wireless device 114. Alternatively, the scanning application 126 can be implemented to deactivate the sensors 132 subsequent to the determination that the signal blocking object 134 is likely blocking the wireless communication, and periodically activate and deactivate the sensors 132 to conserve power.

The mobile device 102 and/or the signal blocking object 134 may move locations such that there is no blocking or disruption of the wireless communication between the mobile device 102 and the wireless device 114. When the heat signature from the signal blocking object 134 is no longer detected by the sensors 132, the sensor data that is generated indicates that the heat signature from the signal blocking object 134 is no longer detected. The scanning application 126 receives the sensor data as the object detection data 136 and determines that the signal blocking object 134 is no longer positioned or located between the mobile device 102 and the wireless device 114. In response, the scanning application 126 can then initiate a retry of the wireless communication between the mobile device 102 and the wireless device 114.

The scanning application 126 can also be implemented to keep the cameras 138 activated subsequent to the determination that the signal blocking object 134 is likely blocking the wireless communication between the mobile device 102 and the wireless device 114. Alternatively, the scanning application 126 can be implemented to deactivate the cameras 138 subsequent to the determination that the signal blocking object 134 is likely blocking the wireless communication, and periodically activate and deactivate the cameras 138 to conserve power. The mobile device 102 or the signal blocking object 134 may move locations such that there is no blocking or disruption of the wireless communication between the mobile device 102 and the wireless device 114. The scanning application 126 receives the image data as the object detection data 136 from the cameras 138, and can determine from the captured image data that the signal blocking object 134 is no longer positioned or located between the mobile device 102 and the wireless device 114. In response, the scanning application 126 can then initiate a retry of the wireless communication between the mobile device 102 and the wireless device 114.

Similarly, the scanning application 126 can be implemented to keep the Bluetooth™ radio of the transceivers 106 and/or the microphone 140 activated subsequent to a determination that the signal blocking object 134 is likely blocking the wireless communication between the mobile device 102 and the wireless device 114. Alternatively, the scanning application 126 can be implemented to deactivate the Bluetooth™ radio and/or the microphone 140 subsequent to the determination that the signal blocking object 134 is blocking the wireless communication, and periodically activate and deactivate the Bluetooth™ radio and/or the microphone 140 to conserve power.

As noted above, the scanning application 126 can infer that a person is blocking the wireless communication based on detecting the person's voice or conversation by the microphone 140. The scanning application 126 can also infer that a user of a particular Bluetooth™ device is blocking the wireless communication based on a scan for other Bluetooth™ devices located near the Bluetooth™ radio of the mobile device 102. The person/user may move locations such that the wireless communication is no longer being blocked or disrupted. The scanning application 126 can receive the object detection data 136 from the Bluetooth™ radio and/or the microphone 140, and determine that the person/user (i.e., as a signal blocking object 134) is no longer likely blocking the wireless communication. In response, the scanning application 126 can initiate a retry of the wireless communication between the mobile device 102 and the wireless device 114. Generally, complete data is received from the wireless device 114 by the transceiver 106 of the mobile device 102 when the signal blocking object 134 is not blocking or disrupting the wireless communication between the devices.

Figure 2:
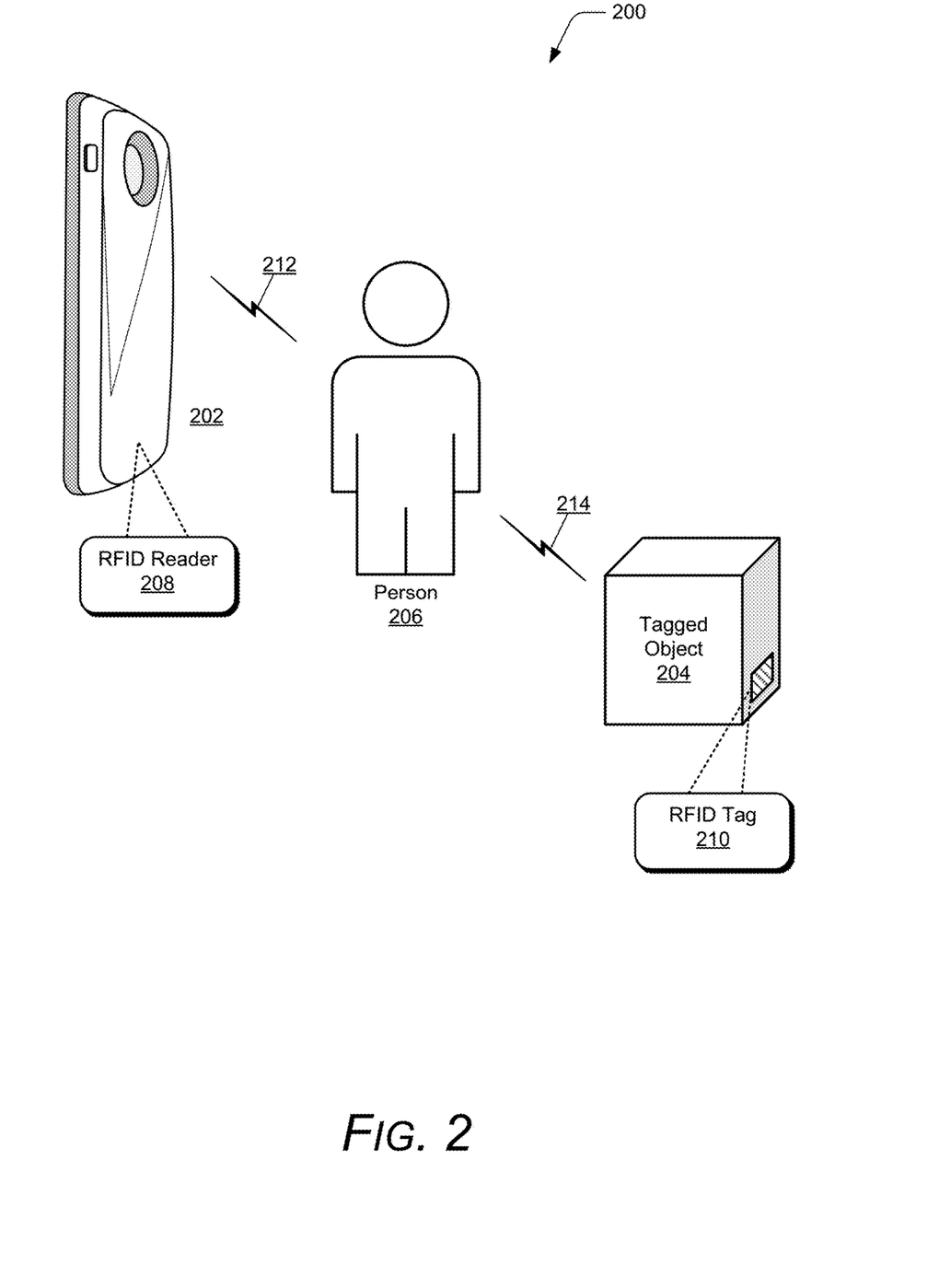
FIG. 2 further illustrates an example system in which aspects of determining blocked wireless communication between devices can be implemented.

FIG. 2 illustrates an example system 200 in which aspects of determining blocked wireless communication between devices can be implemented. The example system 200 includes a mobile device 202, a tagged object 204, and a person 206 that is positioned between the mobile device 202 and the tagged object 204. In this example, the mobile device 202 may be implemented as the mobile device 102 that is shown and described with reference to FIG. 1, and the mobile device 202 includes a radio frequency identifier (RFID) reader 208 for wireless communication with a RFID tag 210 that is placed in or affixed to the tagged object 204.

The person 206 may be in such a position that blocks or disrupts an interrogation signal 212 originating from the RFID reader 208 of the mobile device 202, such that the interrogation signal 212 is not received by the RFID tag 210. Alternatively, the RFID tag 210 may receive the interrogation signal 212 from the RFID reader 208 of the mobile device 202, however, the person 206 may be in a position that blocks or disrupts the response signal 214 originating from the RFID tag 210. The RFID reader 208 of the mobile device 202 may then only receive partial data or no data of the response from the RFID tag 210.

As noted above, the mobile device 202 can be implemented with various sensors, cameras, radios, microphones, and the like that can be activated based on a response of partial data or no data from the RFID tag 210. A scanning application 126 of the mobile device 202 can receive data from each of the various sensors, cameras, radios, and/or microphones as the object detection data 136, and the scanning application 126 utilizes the object detection data 136 to determine whether the person 206 is positioned between the RFID reader 208 and the RFID tag 210. The scanning application 126 can then determine whether the person 206 is likely blocking or disrupting wireless communication based on the person 206 being positioned between the RFID reader 208 and the RFID tag 210.

If the person 206 is determined as likely blocking or disrupting the wireless communication between the RFID reader 208 of the mobile device 202 and the RFID tag 210, then the scanning application 126 can display a notification on the display device 112 of the mobile device 202 indicating that the person 206 is blocking the wireless communication. The scanning application 126 can retry initiation of the wireless communication when the person 206 is determined as not being positioned between the RFID reader 208 and the RFID tag 210.

In implementations, the scanning application 126 keeps any combination of the various sensors, cameras, radios, and microphones activated subsequent to the determination that the person 206 is likely blocking wireless communication between the RFID reader 208 and the RFID tag 210. Alternatively, the scanning application 126 deactivates any combination of the various sensors, cameras, radios, and/or microphones subsequent to the determination that the person 206 is likely blocking the wireless communication to conserve power, and periodically activates and deactivates any one, combination, or all of the various sensors, cameras, radios, and microphones to determine whether the person 206 continues to likely block the wireless communication. When the person 206 is no longer positioned between the RFID reader 208 and the RFID tag 210 as detected by at least one of the various sensors, cameras, radios, and microphones, the scanning application 126 retries initiation of the wireless communication with the RFID tag 210. Generally, a complete response or complete data is received from the RFID tag 210 by the RFID reader 208 when the person 206 is not interfering with the wireless communication.

In another example, the person 206 may not be causing interference with the wireless communication between the RFID reader 208 of the mobile device 202 and the RFID tag 210. Rather, the tagged object 204 itself may be blocking or disrupting the wireless communication. As illustrated in FIG. 2, the RFID tag 210 is affixed to the tagged object 204 such that the tagged object 204 itself is positioned between the RFID reader 208 of the mobile device 202 and the RFID tag 210, which causes interference with the wireless communication between the RFID reader 208 and the RFID tag 210.

The tagged object 204 may be a stationary object that does not move locations, and the scanning application 126 of the mobile device 202 can utilize the sensors 132, the database 128, and/or the mapping 130 to determine relative positioning of the mobile device 202 and the RFID tag 210. If it is determined that the person 206 and/or the tagged object 204 is likely causing interference with the wireless communication, then the scanning application 126 can display a suggestion on the display device 112 of the mobile device 202 that indicates a direction and/or position to move the mobile device 202 for successful wireless communication with the RFID tag 210. The suggestion can be determined based on the relative positioning of the mobile device 202 and the RFID tag 210, and/or based on the object detection data 136 that includes the sensor data, the image data, and/or audio data. Alternatively or in addition, a received signal strength indication (RSSI) can be utilized by the scanning application 126 to determine a position of the mobile device 202 relative to the RFID tag 210. The position of the mobile device 202 based on the RSSI can be utilized by the scanning application 126 in the determination of the suggestion for successful wireless communication with the RFID tag 210.

Example method 300 is described with reference to FIG. 3 in accordance with implementations of determining blocked wireless communication between devices. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
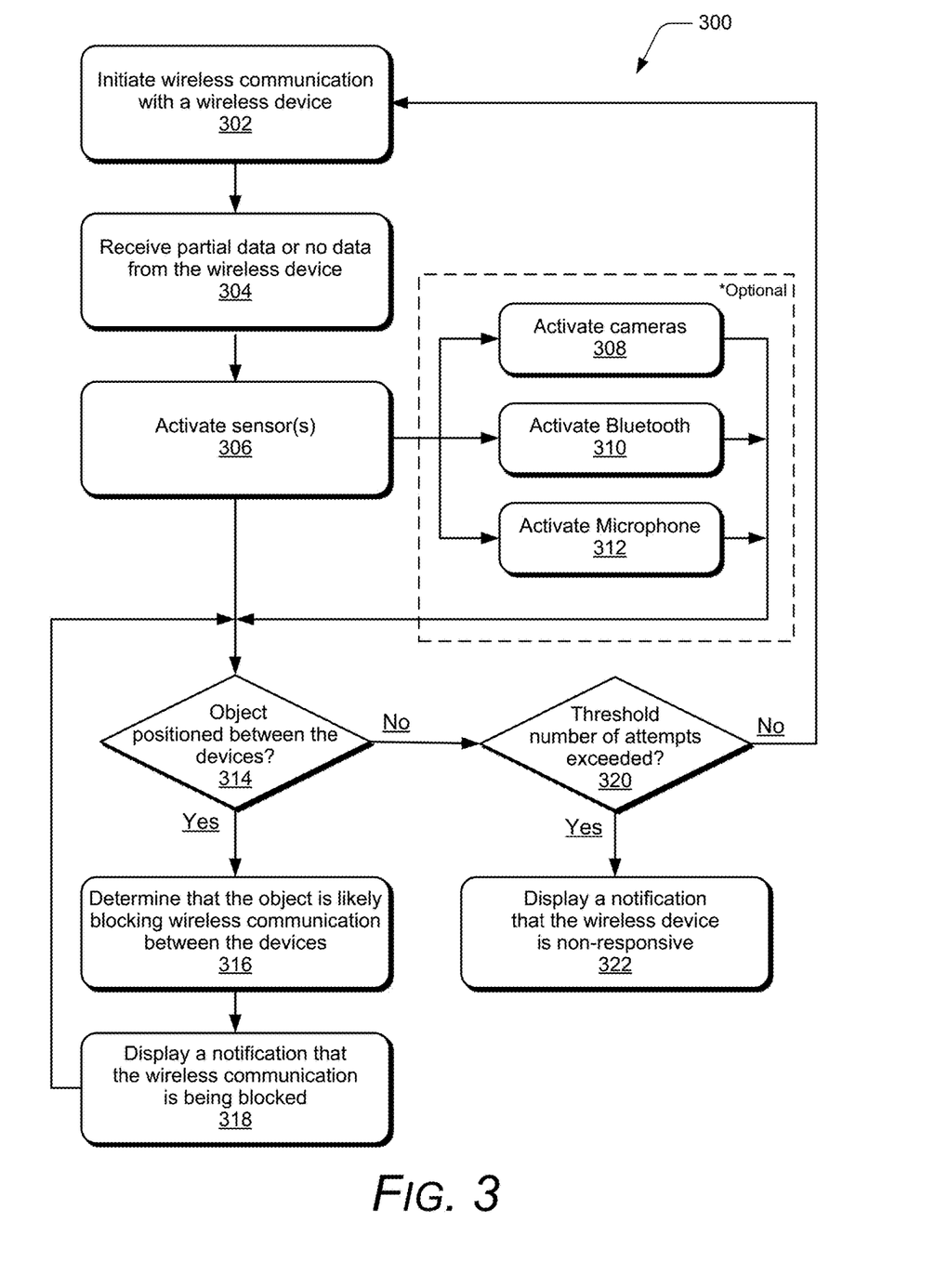
FIG. 3 illustrates an example method of determining blocked wireless communication between devices in accordance with one or more implementations of the techniques described herein.

FIG. 3 illustrates example method(s) 300 of determining blocked wireless communication between devices. The order in which the method is described is not intended to be construed as a limitation, and any number or combination of the described method operations can be performed in any order to perform a method, or an alternate method.

At 302, a wireless communication is initiated with a wireless device via a transceiver of a mobile device. For example, the transceiver 106 of the mobile device 102 initiates the signal 122 (as a wireless communication signal) with the wireless device 114. The transceiver can be the radio-frequency identification (RFID) reader 208 integrated with the mobile device 202, and the wireless device can be the RFID tag 210. The wireless communication with the wireless device 114 may be initiated based on a particular gesture performed by a user of the mobile device 102 or based on a determination that an orientation of the mobile device is facing in a particular direction. The particular gesture or the orientation of the mobile device 102 is determined based on the sensor data obtained from any one or combination of an accelerometer, a gyroscope, and a magnetometer that are integrated with the mobile device 102. In other examples, the wireless communication with the wireless device 114 may be initiated based on a scanning cycle, or based on an input provided by a user of the mobile device 102.

At 304, partial data or no data is received from the wireless device responsive to the wireless communication. For example, the transceiver 106 of the mobile device 102 receives either partial data or no data from the wireless device 114 subsequent to the signal 122 being transmitted by the transceiver 106 to initiate the wireless communication with the wireless device 114.

At 306, sensors are activated to obtain sensor data based on receiving the partial data or no data from the wireless device. For example, the sensors 132 of the mobile device 102 are activated to detect a heat signature from a signal blocking object 134 or person 206, and the sensor data generated by the sensors 132 is communicated to the scanning application 126 as the object detection data 136. The sensors may include a thermal IR sensor for detecting heat signatures from objects. Alternatively or in addition to the sensors 132, other components of the mobile device 102 may be optionally utilized to detect a signal blocking object, as described below with reference to optional features at 308, 310, and 312.

At 308, cameras are optionally activated to capture image data based on receiving the partial data or no data from the wireless device. For example, the cameras 138 of the mobile device 102 are activated to capture optical and/or thermal images of the surrounding environment as image data. The image data is communicated to the scanning application 126 as the object detection data 136.

At 310, Bluetooth™ is optionally activated to scan for other Bluetooth™ devices. For example, a Bluetooth™ radio (of the transceivers 106) of the mobile device 102 is activated to scan for Bluetooth™ devices near the mobile device 102.

Detected Bluetooth™ devices after the scan are communicated to the scanning application 126 as the object detection data 136 to indicate that Bluetooth™ devices are located near the mobile device 102, which can be an indication of a person near the mobile device who may be blocking the wireless communication.

At 312, a microphone is optionally activated to capture or detect audio based on receiving the partial data or no data from the wireless device. For example, the microphone 140 of the mobile device 102 is activated to capture audio near the mobile device 102 as audio data. The audio data is communicated to the scanning application 126 as the object detection data 136 and can indicate that a conversion or a voice of a person near the mobile device 102 is detected, which can be an indication that the person near the mobile device may be blocking the wireless communication.

At 314, a determination is made as to whether an object is positioned between the transceiver of the mobile device and the wireless device based on the object detection data. For example, the scanning application 126 determines whether the signal blocking object 134 is likely blocking the wireless communication between the transceiver 106 of the mobile device 102 and the wireless device 114 based on the sensor data received from the sensors 132 (e.g., thermal IR sensor data) that indicates the signal blocking object 134 is positioned between the devices. Alternatively or in addition, the scanning application 126 determines whether the signal blocking object 134 is likely blocking the wireless communication based on the captured image data received from the cameras 138 that indicates the signal blocking object 134 is positioned between the devices. Alternatively or in addition, the scanning application 126 can also determine whether the signal blocking object 134 is likely blocking the wireless communication based on the detected Bluetooth™ devices and/or audio data received from the Bluetooth™ radio and/or from the microphone 140 that indicates a person is near the mobile device 102 as discussed above.

If it is determined that the object is positioned between the transceiver of the mobile device and the wireless device (i.e., "Yes" from 314), then at 316, a determination is made that the object is likely blocking the wireless communication between the transceiver of the mobile device and the wireless device. At 318, a notification is displayed indicating that the wireless communication is being blocked based on the determining that the object is positioned between the devices. For example, the scanning application 126 displays the notification indicating that signal blocking object 134 is blocking the wireless communication. The notification can include a suggestion that indicates a direction and/or position to move the mobile device 102 for successful wireless communication with the wireless device 114. Subsequent to the notification being displayed at 318, the method 300 can optionally continue at 314 to perform another determination as to whether the object is still positioned between the devices.

If it is determined that the object is not positioned between the transceiver of the mobile device and the wireless device (i.e., "No" from 314), then at 320, a determination is made as to whether a threshold number of communication attempts has been exceeded. If the threshold number of communication attempts is exceeded (i.e., "Yes" from 320), then at 322, a notification is displayed indicating that the wireless device is non-responsive. For example, a notification can be displayed on the display device 112 of the mobile device 102 that the wireless device 114 is non-responsive, and may be defective, malfunctioning, or missing. If the threshold number of communication attempts has not been exceeded (i.e., "No" from 320), then the method 300 continues at 302, where a subsequent wireless communication is initiated with the wireless device via the transceiver of the mobile device.

Figure 4:
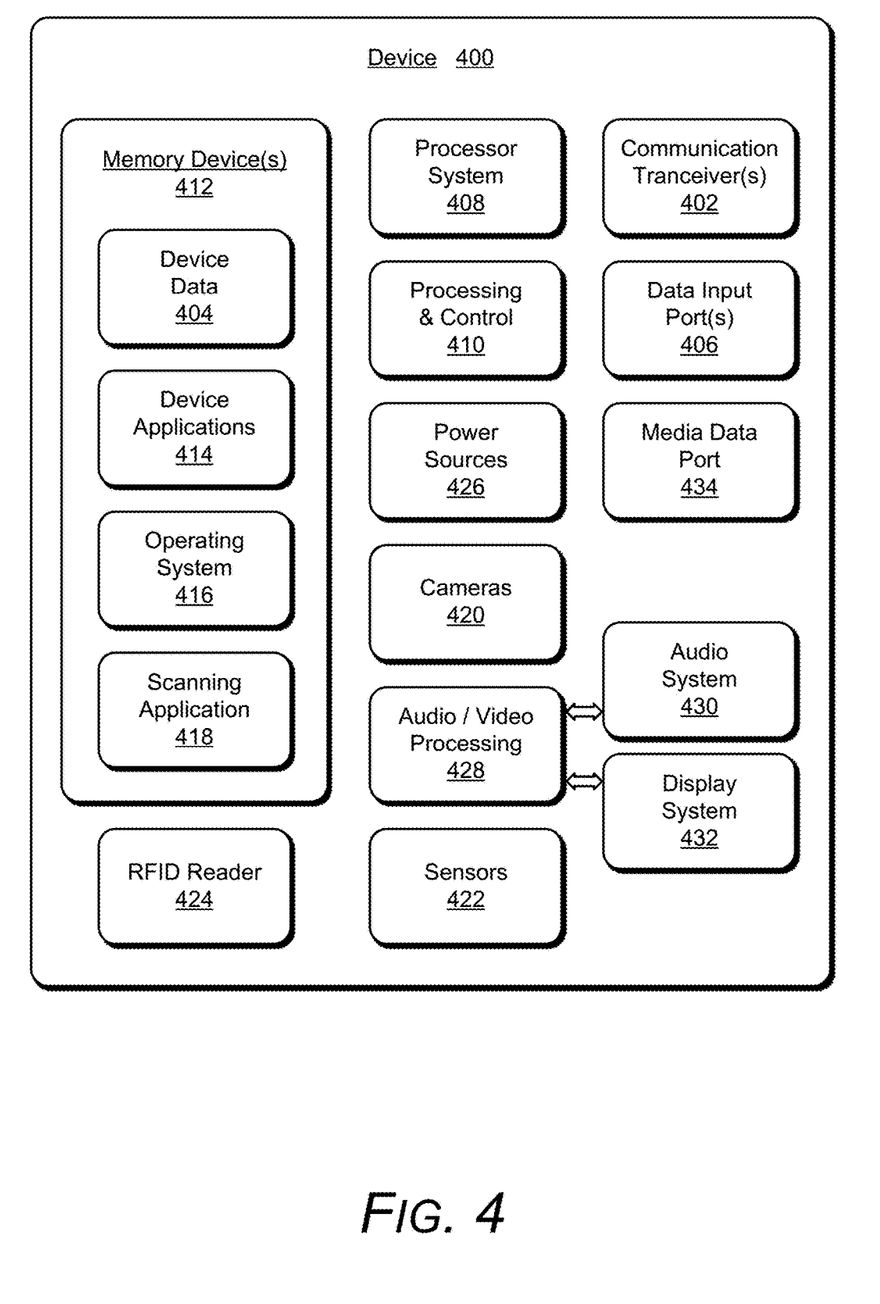
FIG. 4 illustrates various components of an example device that can implement aspects of determining blocked wireless communication between devices.

FIG. 4 illustrates various components of an example device 400 in which aspects of determining blocked wireless communication between devices can be implemented. The example device 400 can be implemented as any of the devices described with reference to the previous FIGS. 1-3, such as any type of mobile device, mobile phone, client device, tablet, computing, communication, entertainment, gaming, media playback, and/or other type of electronic device. For example, the mobile device 102, the wireless device 114, and the mobile device 202 that are shown and described with reference to FIGS. 1-3 may be implemented as the example device 400.

The device 400 includes communication transceivers 402 that enable wired and/or wireless communication of device data 404 with other devices. The device data 404 can include any of the object detection data, the database, and the mapping. Additionally, the device data 404 can include any type of audio, video, and/or image data. Example communication transceivers 402 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 400 may also include one or more data input ports 406 via which any type of data, media content, and/or inputs can be received, such as user selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus can include any one or combination of different bus structures and architectures, as well as control and data lines.

The device 400 also includes computer-readable storage memory 412 (e.g., memory devices) that enable data storage, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read only memory (ROM), flash memory, and other types of storage media in various memory device configurations. The device 400 may also include a mass storage media device.

The computer-readable storage memory 412 provides data storage mechanisms to store the device data 404, other types of information and/or data, and various device applications 414 (e.g., software applications). For example, an operating system 416 can be maintained as software instructions with a memory device and executed by the processing system 408. The device applications may also include a device manager, such as any form of a control application, software application, signal-processing and control module, code that is native to a particular device, a hardware abstraction layer for a particular device, and so on.

In this example, the device 400 includes a scanning application 418 that implements aspects of determining blocked wireless communication between devices, and may be implemented with hardware components and/or in software as one of the device applications 414, such as when the device 400 is implemented as the mobile device 102 described with reference to FIGS. 1-3. An example of the scanning application 418 is the scanning application 126 that is implemented as a software application and/or as hardware components in the mobile device 102 as described with reference to FIG. 1, or as the mobile device 202 as described with reference to FIG. 2. In implementations, the scanning application 418 may include independent processing, memory, and logic components as a computing and/or electronic device integrated with the device 400.

In this example, the device 400 includes cameras 420 that can be implemented with various cameras that may include an optical camera, thermal camera, and/or other types of cameras to capture images. The device 400 also includes sensors 422 that can be implemented with various sensors, such as a gyroscope, an accelerometer, and/or other types of motion sensors to sense motion of the device. The various sensors 422 may also include a thermal infra-red (IR) sensor and/or other types of heat sensors to detect a heat signature from an object. The various sensors 422 may also be implemented as components of an inertial measurement unit (IMU) or micro-electro-mechanical system (MEMS) in the device 400.

The device 400 also includes a radio-frequency identification (RFID) reader 424 that is implemented to interrogate RFID tags for identifying data and receive identification responses from the RFID tags. An example of the RFID reader 424 is the RFID reader 208 that is implemented as an integrated component of the mobile device 202 or as an attachment that operates with the mobile device. The device 400 can also include one or more power sources 426, such as when the device is implemented as a mobile device. The power sources may include a charging and/or power system, and can be implemented as a flexible strip battery, a rechargeable battery, a charged super-capacitor, and/or any other type of active or passive power source.

The device 400 also includes an audio and/or video processing system 428 that generates audio data for an audio system 430 and/or generates display data for a display system 432. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 434. In implementations, the audio system and/or the display system are integrated components of the example device. Alternatively, the audio system and/or the display system are external, peripheral components to the example device.

Although implementations of determining blocked wireless communication between devices have been described in language specific to features and/or methods, the subject of the appended claims is not necessarily limited to the specific features or methods described. Rather, the features and methods are disclosed as example implementations of determining blocked wireless communication between devices, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method performed by a mobile device for determining that an object is blocking wireless communication, the method comprising: initiating, via a transceiver of the mobile device, the wireless communication with a wireless device; receiving partial data or no data from the wireless device responsive to the wireless communication; activating one or more sensors to obtain sensor data based on the receiving the partial data or no data from the wireless device; determining whether the object is positioned or located between the mobile device and the wireless device based on the sensor data; determining that the object is likely blocking the wireless communication between the transceiver of the mobile device and the wireless device based on the determining that the object is positioned or located between the mobile device and the wireless device; and displaying a notification that the wireless communication is being blocked based on the determining that the object is likely blocking the wireless communication.

Alternatively or in addition to the above described method, any one or combination of: the transceiver is a radio-frequency identification (RFID) reader and the wireless device is a RFID tag. The one or more sensors is a thermal infra-red (IR) sensor and the determining whether the object is blocking the wireless communication is based on the sensor data obtained from the thermal IR sensor. The wireless communication with the wireless device is initiated in response to one of: determining a particular gesture; or determining that an orientation of the mobile device is facing in a particular direction. The particular gesture and the orientation of the mobile device is determined based on the sensor data obtained from at least one of an accelerometer, a gyroscope, and a magnetometer. The method further comprising activating a camera to capture image data; and wherein the determining whether the object is positioned or located between the mobile device and the wireless device is further based on the captured image data. The method further comprising repeating the determining whether the object is positioned or located between the mobile device and the wireless device until the object is not positioned or located between the mobile device and the wireless device; repeating the initiating the wireless communication with the wireless device; and receiving complete data from the wireless device responsive to the wireless communication. The method further comprising in response to said repeating the initiating the wireless communication exceeding a threshold number of communication attempts, displaying another notification that the wireless device is non-responsive.

A mobile device, comprising: a radio-frequency identification (RFID) reader to communicate with RFID tags; a display device to display a notification that a wireless communication is being blocked; a memory and a processing system to implement a scanning application that is configured to: initiate the wireless communication as an interrogation of a RFID tag by the RFID reader; activate one or more sensors to obtain sensor data based on a response from the RFID tag of partial data or no data; determining whether an object is positioned or located between the mobile device and the RFID tag based on the sensor data; and determining that the object is likely blocking the interrogation from the RFID reader or the response from the RFID tag.

Alternatively or in addition to the above described mobile device, any one or combination of: the interrogation of the RFID tag by the RFID reader is initiated responsive to one of: a particular gesture being detected; or an orientation of the mobile device facing in a particular direction is detected. The particular gesture and the orientation of the mobile device is detected based on sensor data obtained from at least one of an accelerometer, a gyroscope, and a magnetometer. The interrogation of the RFID tag by the RFID reader is initiated based on a scanning cycle. The scanning application is further configured to adjust the scanning cycle to delay a subsequent interrogation of the RFID tag responsive to the determination that the object is likely blocking the interrogation from the RFID reader or the response from the RFID tag. The scanning application is further configured to activate a camera to capture image data; and wherein the determination of whether the object is positioned or located between the mobile device and the RFID tag is further based on the captured image data. The scanning application is further configured to display a notification that the interrogation is being blocked based on the determination that the object is likely blocking the interrogation from the RFID reader or the response from the RFID tag. The scanning application is further configured to repeat the determination of whether the object is positioned or located between the mobile device and the RFID tag until the object is not positioned or located between the mobile device and the RFID tag; repeat the initiation of the interrogation of the RFID tag; and receive complete data from the RFID tag responsive to the interrogation from the RFID reader.

A system, comprising: a radio-frequency identification (RFID) tag associated with a tagged object; a RFID reader to communicate with the RFID tag; a scanning application that is configured to: initiate a wireless communication as an interrogation of the RFID tag by the RFID reader; determine whether an object is positioned or located between the mobile device and the RFID tag based on object detection data; determine that the object is likely blocking the interrogation from the RFID reader or a response from the RFID tag based on the determining that the object is positioned or located between the mobile device and the RFID tag; and initiate an action to resolve the interrogation from the RFID reader or the response from the RFID tag from being blocked by the object.

Alternatively or in addition to the above described system, any one or combination of: the action initiated to resolve the interrogation or the response from being blocked includes at least one of display a notification that the interrogation or the response is being blocked; adjust a scanning cycle to delay a subsequent interrogation of the RFID tag by the RFID reader; and repeat the determination of whether the object is positioned or located between the mobile device and the RFID tag until the object is not positioned or located between the mobile device and the RFID tag. The object detection data is sensor data obtained from one or more sensors, the sensor data indicating that the object is positioned or located between the RFID reader and the RFID tag. The object detection data is image data captured with a camera, the image data indicating that the object is positioned or located between the RFID reader and the RFID tag.

The invention claimed is:

1. A method performed by a mobile device for determining that an object is blocking wireless communication, the method comprising:
   initiating, via a transceiver of the mobile device, the wireless communication with a wireless device;
   receiving partial data or no data from the wireless device responsive to the wireless communication;
   activating one or more sensors to obtain sensor data based on the receiving the partial data or no data from the wireless device;
   determining whether the object is positioned or located between the mobile device and the wireless device based on the sensor data;
   determining that the object is likely blocking the wireless communication between the transceiver of the mobile device and the wireless device based on the determining that the object is positioned or located between the mobile device and the wireless device;
   displaying a notification that the wireless communication is being blocked based on the determining that the object is likely blocking the wireless communication;
   repeating the determining whether the object is positioned or located between the mobile device and the wireless device until the object is not positioned or located between the mobile device and the wireless device; and
   repeating the initiating the wireless communication with the wireless device until receiving complete data from the wireless device responsive to the wireless communication.

2. The method as recited in claim 1, wherein the transceiver is a radio frequency identification (RFID) reader and the wireless device is a RFID tag.

3. The method as recited in claim 1, wherein the one or more sensors is a thermal infra-red (IR) sensor and the determining whether the object is blocking the wireless communication is based on the sensor data obtained from the thermal IR sensor.

4. The method as recited in claim 1, wherein the wireless communication with the wireless device is initiated in response to one of:
   determining a particular gesture; or
   determining that an orientation of the mobile device is facing in a particular direction.

5. The method as recited in claim 4, wherein the particular gesture and the orientation of the mobile device is determined based on the sensor data obtained from at least one of an accelerometer, a gyroscope, and a magnetometer.

6. The method as recited in claim 1, further comprising:
   activating a camera to capture image data; and
   wherein the determining whether the object is positioned or located between the mobile device and the wireless device is further based on the captured image data.

7. The method as recited in claim 1, further comprising:
   in response to said repeating the initiating the wireless communication exceeding a threshold number of communication attempts, displaying another notification that the wireless device is non-responsive.

8. The method as recited in claim 1, further comprising:
   adjusting a scanning cycle to delay a subsequent wireless communication responsive to the determining that the object is likely blocking the wireless communication between the transceiver of the mobile device and the wireless device.

9. A mobile device, comprising:
   a radio-frequency identification (RFID) reader to communicate with RFID tags;
   a display device to display a notification that a wireless communication is being blocked;
   a memory and a processing system to implement a scanning application that is configured to:
      initiate the wireless communication as an interrogation of a RFID tag by the RFID reader, the interrogation being initiated based on a scanning cycle;
      activate one or more sensors to obtain sensor data based on a response from the RFID tag of partial data or no data;
      determine whether an object is positioned or located between the mobile device and the RFID tag based on the sensor data;
      determine that the object is likely blocking the interrogation from the RFID reader or the response from the RFID tag; and adjust the scanning cycle to delay a subsequent interrogation of the RFID tag responsive to the determination that the object is likely blocking the interrogation from the RFID reader or the response from the RFID tag.

10. The mobile device as recited in claim 9, wherein the interrogation of the RFID tag by the RFID reader is initiated responsive to one of:
a particular gesture being detected; or
an orientation of the mobile device facing in a particular direction is detected.

11. The mobile device as recited in claim 10, wherein the particular gesture and the orientation of the mobile device is detected based on sensor data obtained from at least one of an accelerometer, a gyroscope, and a magnetometer.

12. The mobile device as recited in claim 9, wherein the scanning application is further configured to:
activate a camera to capture image data; and
wherein the determination of whether the object is positioned or located between the mobile device and the RFID tag is further based on the captured image data.

13. The mobile device as recited in claim 9, wherein the scanning application is further configured to:
display a notification that the interrogation is being blocked based on the determination that the object is likely blocking the interrogation from the RFID reader or the response from the RFID tag.

14. The mobile device as recited in claim 9, wherein the scanning application is further configured to:
repeat the determination of whether the object is positioned or located between the mobile device and the RFID tag until the object is not positioned or located between the mobile device and the RFID tag;
repeat the initiation of the interrogation of the RFID tag; and
receive complete data from the RFID tag responsive to the interrogation from the RFID reader.

15. The mobile device as recited in claim 14, wherein the scanning application is further configured to display another notification that the wireless device is non-responsive in response to the interrogation of the RFID tag being repeated exceeding a threshold number of communication attempts.

16. A system, comprising:
a radio-frequency identification (RFID) tag associated with a tagged object;
a RFID reader to communicate with the RFID tag;
a scanning application that is configured to:
initiate a wireless communication as an interrogation of the RFID tag by the RFID reader;
determine whether an object is positioned or located between the RFID reader and the RFID tag based on object detection data;
determine that the object is likely blocking the interrogation from the RFID reader or a response from the RFID tag based on the determining that the object is positioned or located between the RFID reader and the RFID tag; and
initiate an action to resolve the interrogation from the RFID reader or the response from the RFID tag from being blocked by the object, the action including to adjust a scanning cycle to delay a subsequent interrogation of the RFID tag by the RFID reader.

17. The system as recited in claim 16, wherein the action initiated to resolve the interrogation or the response from being blocked further includes at least one of:
display a notification that the interrogation or the response is being blocked; and
repeat the determination of whether the object is positioned or located between the RFID reader and the RFID tag until the object is not positioned or located between the RFID reader and the RFID tag.

18. The system as recited in claim 16, wherein the object detection data is sensor data obtained from one or more sensors, the sensor data indicating that the object is positioned or located between the RFID reader and the RFID tag.

19. The system as recited in claim 16, wherein the object detection data is image data captured with a camera, the image data indicating that the object is positioned or located between the RFID reader and the RFID tag.

20. The system as recited in claim 16, wherein the scanning application is configured to:
initiate repeats of the wireless communication as an interrogation of the RFID tag by the RFID reader; and
in response to the repeats of the wireless communication exceeding a threshold number of interrogation attempts, display a notification that the RFID tag is non-responsive.

* * * * *